UNITED STATES PATENT OFFICE.

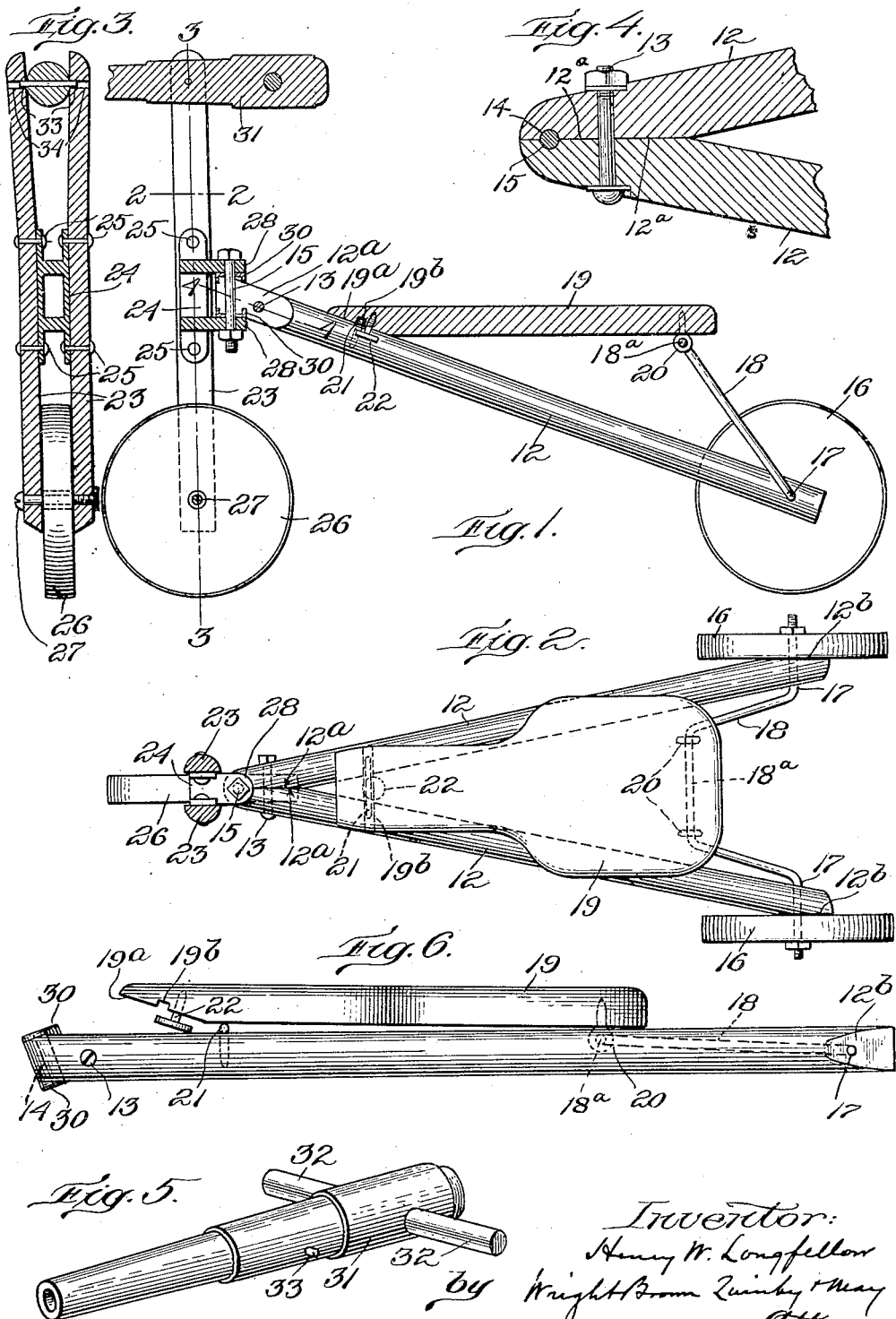

HENRY W. LONGFELLOW, OF BOSTON, MASSACHUSETTS, ASSIGNOR OF ONE-HALF TO WALTER P. DECKER, OF BOSTON, MASSACHUSETTS; MARIA T. B. LONGFELLOW ADMINISTRATRIX OF SAID HENRY W. LONGFELLOW, DECEASED.

CHILD'S VEHICLE.

1,331,072. Specification of Letters Patent. Patented Feb. 17, 1920.

Application filed January 29, 1919. Serial No. 273,698.

*To all whom it may concern:*

Be it known that I, HENRY W. LONG-FELLOW, a citizen of the United States, residing at Boston, in the county of Suffolk and State of Massachusetts, have invented new and useful Improvements in Children's Vehicles, of which the following is a specification.

This invention relates to a vehicle adapted to be moved by the alternate thrust of the feet of the rider on the floor, the vehicle being intended to be used by small children, and including a body which the rider bestrides. The vehicle is provided with a traveling rear support including a pair of traveling members, such as wheels, or runners, and a dirigible traveling forward support including an upright steering post pivotally connected with the forward portion of the body, and a traveling member, such as a single wheel, or runner, connected with the post.

One object of the invention is to provide a simple, strong, durable and relatively inexpensive body, composed mainly of two longitudinal bars which may be cylindrical wooden bars or rods.

Another object of the invention is to provide a similarly characterized steering post the main portions of which may be formed by longitudinally splitting or severing a single wooden bar or rod.

Another object of the invention is to provide a knockdown vehicle adapted to be compactly folded for storage and transportation.

To these and other related ends the invention consists in the improvements which I will now proceed to describe and claim.

Of the accompanying drawings forming a part of this specification,—

Figure 1 is a longitudinal vertical central section of a child's vehicle embodying the invention.

Fig. 2 is a plan view shown in section on line 2—2 of Fig. 1.

Fig. 3 is a section on line 3—3 of Fig. 1.

Fig. 4 is a fragmentary section on line 4—4 of Fig. 1.

Fig. 5 is a perspective view of the handle member hereinafter referred to.

Fig. 6 is an edge view showing the body and seat folded together, the body being detached from the steering post, and the rear wheels removed from the body.

The same reference characters indicate the same parts in all of the figures.

The body of my improved vehicle is preferably V-shaped, and composed of a pair of longitudinally extending bars 12, which may be wooden bars or rods, and are rigidly connected at their forward ends to form a head, and diverge toward their rear ends. The bars 12 are preferably beveled at the inner sides of their forward ends to form faces 12ª which are abutted together and united as by a bolt or rivet 13, the head thus formed being provided with a pintle-receiving socket 14, formed by boring the head, and adapted to receive a hinge pintle 15 connected with the steering post, as hereinafter described.

The bars 12 diverge from their connected forward ends to their rear ends, as shown by Fig. 2. The bars 12 beveled and rigidly connected at their forward ends, constitute a simple and strong V-shaped body which may be manufactured at a small expense, owing to the fact that said bars may be provided by cutting into suitable lengths an ordinary dowel bar or rod, and beveling the ends of the lengths. A dowel bar or rod is a well known article of manufacture commonly utilized by cutting it into shorter lengths forming dowels. Dowel bars are usually made from edgings sawed from boards or planks, the edges being turned to a cylindrical form by a suitable machine to which they are fed, and from which they emerge as cylindrical rods, constituting an inexpensive by-product.

Connected with the body thus formed are rear wheels 16, connections between the wheels and the body bars being preferably provided by a rear axle, which includes axle arms 17 extending through sockets or bearings formed for their reception in the rear portions of the body bars 12, and a crank portion 18 between the axle arms.

19 represents a seat, the forward end portion of which is detachably connected with the forward portion of the body, while the rear end portion is supported above the body, preferably by the crank portion 18 which is hinged to the rear end portion of the seat by suitable means such as screw eyes 20, engaged with the seat and embracing the neck 18ª of the crank portion 18.

The body and the forward end portion of the seat are provided with complemental coupling parts adapted to separably connect said members, and, as here shown, including a transverse member such as a staple-shaped metal rod 21, engaged at its ends with the bars 12, and a complemental member 22, which may be a headed screw adjustably engaged with the forward end portion of the seat, the head of the screw being adapted to project under the member 21. When the members 21 and 22 are interengaged, the crank portion 18 is caused to project upwardly from the body and support the rear end of the seat above the body as shown by Fig. 1, said crank portion constituting a strut. When the coupling members 21 and 22 are disconnected, the body, seat and crank portion may be folded as shown by Fig. 6, the rear end of the seat resting on the body, and the crank portion 18 being swung between the body arms. It will be seen, therefore, that when the rear wheels 16 are removed and the seat is folded against the body, the portion of the vehicle thus far described is reduced to a compact form for storage and shipment. The portion of the seat which bears on the body is preferably beveled to form a face 19ª (Fig. 6) conforming to the inclination of the body, and provided with a slot 19ᵇ receiving the member 21.

The body bars 12 are preferably beveled at the outer sides of their rear ends to form parallel wheel-opposing faces 12ᵇ, which are parallel with and opposed to the inner sides of the rear wheels 16.

The steering post preferably includes two longitudinal bars 23 which may advantageously be formed by longitudinally severing a cylindrical wooden bar or rod, the members 23 being therefore, semi-cylindrical and arranged with their flat sides inward, as shown by Fig. 2.

The middle portions of the post members 23 are rigidly connected by a spacing member 24, which may be a casting of the general form represented by Figs. 1 and 3, and connected by rivets 25 with the members 23. The steering wheel 26 is interposed between the lower end portions of the members 23 and connected therewith by a suitable pin or axle 27.

With the steering post is connected the hinge pintle 15, which is preferably inserted in and supported by ears 28, formed on and projecting rearwardly from the spacing member 24, so that the pintle member is offset rearwardly from the steering post. The ears 28 and the pintle constitute a hinge member which supports the forward end of the body. The pintle member passes through the socket 14 in the head portion of the body, said head portion being supported by the lower ear 28, and being preferably reinforced by annular washers or reinforcing members 30 at opposite ends of the socket 14, as shown by Fig. 1. The pintle member is preferably a so-called stove bolt having a head at one end, and a removable nut at the opposite end, so that the pintle member may be removed to permit the separation of the steering post from the body.

The upper end portions of the post members 23, when made of wood as described, are resilient and adapted to be sprung outwardly, their resilience causing them to normally spring inward. I utilize the resilient portions of the members 23 to detachably connect with the steering post a handle member, which, as here shown, is an elongated body 31 resembling a cannon, and provided with laterally projecting grip portions 33 (Fig. 5) adapted to be grasped by the rider. The member 31 is adapted to be forced between the upper end portions of the post members 23, and to spring said members outwardly, as shown by Fig. 3, the member 31 being provided with trunnions 33 formed to enter bearings or sockets 34 formed in the members 23.

The steering post may be detached from the body, and the handle member 31 may be detached from the steering post, so that these parts may be compactly stored.

As implied in the foregoing description and in the following claims, I am not limited to the specific construction of the preferred embodiment of my improvements shown by the drawings, except as otherwise required in certain of the more limited claims.

The body, the seat, the strut, and the connections between the seat, body, and strut, constitute a foldable structure which includes a front connection between the forward end portions of the body and seat, and embodied in the members 21 and 22, and a rear connection between the swinging end of the strut and the rear end portion of the seat, and embodied in the members 18ª and 20, one of said connections forming a hinge, and the members of the other connection being separable, the arrangement being such that when the last mentioned members are separated, the seat and strut are displaceable from their operative positions.

I claim:

1. A vehicle of the character stated, comprising a steering post having a steering wheel and a hinge pintle member above the steering wheel, a body having a head at its forward end constituting a hinge socket member coöperating with said pintle member, rear wheels connected with the body, a seat detachably connected at its front end with the body, and a strut pivotally connected with the body and with the rear end portion of the seat, and adapted to support said rear end portion above the body, said body, seat, and strut being foldable.

2. A vehicle of the character stated, comprising a steering post having a steering wheel and a hinge pintle member above the steering wheel, a V-shaped body composed of a pair of longitudinally extending bars connected at their forward ends to form a head constituting a hinge socket member coöperating with said pintle member, said bars diverging toward their rear ends, a rear axle including axle arms journaled in the rear portions of said bars, and a crank portion forming a seat-supporting strut adapted to swing between the body bars, rear wheels on said axle arms, and a seat detachably connected with the body at its forward end and hinged at its rear end to said crank portion, said body, seat, and crank portion being foldable.

3. A vehicle of the character stated, comprising a steering post having a steering wheel and a hinge pintle member above the steering wheel, a V-shaped body composed of a pair of longitudinally extending bars connected at their forward ends to form a head constituting a hinge socket member coöperating with said pintle member, said bars diverging toward their rear ends, and being provided near their forward ends with a coupling member, a rear axle including axle arms journaled in the rear portions of said bars, and a crank portion forming a seat-supporting strut adapted to swing between the body bars, rear wheels on said axle arms, and a seat provided at its forward end portion with a coupling member separably engaged with the coupling member on the body and hinged at its rear end to said crank portion, the rear end of the seat being supported by said crank portion above the body when said coupling members are interengaged, and adapted to rest on the body when the coupling members are disconnected.

4. A vehicle of the character stated, comprising a steering post having a steering wheel, and a foldable structure including a body hinged to the steering post and having rear wheels, a seat, a front connection between the forward end portions of the body and seat, a strut pivoted at one end to the rear end of the body, and adapted to swing at its opposite end, and a rear connection between the swinging end of the strut and the rear end portion of the seat, the members of one of said connections forming a hinge, and the members of the other connection being separable.

5. A child's vehicle comprising a steering-post having a steering-wheel, and a foldable structure including a body hinged to the steering-post and having rear wheels, said body being V-shaped and composed of bars united at their forward ends to form a head, and diverging therefrom to their rear ends, a seat, a front connection between the forward end portions of the body and seat, a swinging strut pivoted between the rear ends of the bars and adapted to enter the space between the bars, and a rear connection between the swinging end of the strut and the rear end portion of the seat, the members of one of said connections forming a hinge, and the members of the other connection being separable.

6. A child's vehicle comprising a steering-post having a steering-wheel, a V-shaped body hinged to the steering-post, and composed of bars united at their forward ends to form a head and diverging therefrom to their rear ends, a crank axle journaled in the rear end portions of said bars and provided with rear wheels, the crank portion of said axle constituting a strut adapted to swing into the space between the bars, a seat, a front connection between the forward end portions of the body and seat, and a rear connection between the swinging end of said strut and the rear portion of the seat, one of said connections forming a hinge, and the members of the other connection being separable, said body, strut and seat constituting a foldable structure.

7. A child's vehicle comprising a steering-post having a steering-wheel and a hinge member including a pintle, and a foldable structure including a V-shaped body having rear wheels and composed of diverging bars united at their forward ends to form a head constituting a hinge socket supported by said member and engaged with said pintle, a seat, a front connection between the forward end portions of the body and seat, a swinging strut pivoted between the rear ends of the bars and adapted to enter the space between the bars, and a rear connection between the swinging end of the strut and the rear end portion of the seat, the members of one of said connections forming a hinge, and the members of the other connection being separable.

8. A child's vehicle comprising a steering-post having a steering-wheel and a hinge member including a pintle, and a foldable structure including a V-shaped body having rear wheels, and composed of diverging bars beveled at their forward ends to form abutting faces, united to form a head which is supported by said hinge member and bored to form a socket engaging said pintle, said head being provided with annular reinforcing members at opposite ends of said socket, a seat, a front connection between the forward end portions of the body and seat, a swinging strut pivoted between the rear ends of the bars and adapted to enter the space between the bars, and a rear connection between the swinging end of the strut and the rear end portion of the seat, the members of one of said connections forming a hinge, and the members of the other connection being separable.

In testimony whereof I have affixed my signature.

HENRY W. LONGFELLOW.